3,403,145
ACETYLATION OF CELLULOSE

Dexter Edge, Jr., Michael D. Fahey, and Robert G. Rickey, all c/o Rayonier Incorporated, Olympic Research Division, Shelton, Wash. 98584
No Drawing. Continuation of application Ser. No. 208,916, July 10, 1962. This application June 26, 1967, Ser. No. 649,050
4 Claims. (Cl. 260—227)

ABSTRACT OF THE DISCLOSURE

A process for the partial acetylation of cellulose comprising preswelling substantially dry cellulose fiber and the acetylation of the preswelled fiber with superheated acetic anhydride vapor.

---

This case is a continuation of Ser. No. 208,916 filed July 10, 1962 and now abandoned.

This invention relates to the partial acetylation of cellulose, and has for its object the provision of a non-catalyzed process for the acetylation of cellulose fiber. More particularly, the process of the invention comprises preswelling substantially dry cellulose fiber and the acetylation of the preswelled fiber with superheated acetic anhydride vapor at an elevated temperature. The process of the invention can achieve a rapid and uniform acetylation of cellulose to contain up to 30% acetyl.

The efforts made heretofore to effect non-catalytic vapor phase actylation of cellulose have not been commerically practical for they have resulted either in degraded products or products only slightly acetylated. Processes employing vapor phase acetylation together with catalysts have had an adverse effect on the product. The more commonly used catalysts, i.e., sulfuric or perchloric acids, are corrosive to equipment, difficult to remove from the product and tend to degrade the product resulting in lowering its stability, strength, color and dielectric properties. The invention overcomes these difficulties and provides a relatively rapid process of making a high quality product having an acetyl content up to 30% at a relatively low cost.

The invention is based upon the discovery that essentially dry cellulose fibers in a swollen condition and without a catalyst can be effectively acetylated by means of superheated acetic anhydride vapors. Based upon this discovery the invention provides a process comprising swelling cellulose fibers, such as wood pulp fibers, cotton linters, in bulk, matte sheet or fabric form, with a swelling agent, preferably concentrated acetic acid, followed by contacting the swollen fibers with acetic anhydride and then subjecting the fibers to non-catalytic acetylation in substantially dry superheated vapors of acetic anhydride to form dry cellulose fibers having up to 30% acetyl. In an advantageous treatment of the invention the dry, preferably around 94 to 96% bone dry cellulose is preswollen with acetic acid of low water content such as concentrated acetic acid or glacial acetic acid, or equivalent swelling agent, and any excess acid is removed or displaced with acetic anhydride, and while the fibers contain residual acetic acid and acetic anhydride they are contacted with substantially dry superheated acetic anhydride vapor to effect the desired amount of acetylation.

The acetylation with superheated acetic anhydride vapor makes it possible to carry out an essentially dry process with attendant advantages. The temperatures necessary for the reaction are attainable at or near atmospheric pressure. This permits the use of thin-walled low pressure type reaction vessels, and since the superheated vapors are dry they are relatively not corrosive. Hence, low cost materials, such as aluminum, may be used for the reaction chambers.

In carrying out a process of the invention it is preferred to use dry cellulose fiber in any suitable form such as wood pulp, cotton linters, fabric, sheet or paper and to swell the fiber by treatment with acetic acid, advantageously of low water content, at ambient or slightly higher temperatures. The cellulose may be immersed in the acetic acid or the acid may be sprayed onto the fibers. Any convenient time may be used, but a minimum of about 10 minutes is required to complete the swelling in most cases, although times over about 30 minutes afford no perceptible additional benefit. Excess acetic acid (if any) is removed so that the swollen fiber will contain from about 10 to 60 percent (preferably 25 to 30 percent) acetic acid on the weight of the cellulose. The swollen fiber is then saturated with acetic anhydride as by dipping or spraying at a temperature ranging from ambient to 140° C. The saturated fiber containing both acetic acid and anhydride is then acetylated in a suitable reactor by exposure to essentially dry, superheated acetic anhydride vapor at a temperature of from 150 to 220° C., preferably for from 15 to 90 minutes. The proper treatment time will depend upon the character of the cellulose fiber being acetylated, the desired degree of acetylation, the actual temperature of the treatment and the concentration of acetic anhydride vapors in the reactor. The acetylated fiber will emerge from the reactor in essentially dry finished form. When sheets of cellulose are treated they can be acetylated to retain their original sheet form.

The foregoing process lends itself readily to either batch or continuous processing. A continuous process is usually preferred for reasons of uniformity of product quality, increased speed of production and economy of operation. Whether batch or continuous processing is used, however, it is important to operate within the foregoing limitations if a useful product is to be obtained. It is particularly important to avoid excess carry-over of acetic acid from the preswelling step to the acetylation step with the swollen fiber. This is accomplished by limiting the amount of acetic acid added to the fiber to from 10 to 60 percent based upon the weight of the dry cellulose (perferably 25 to 30 percent) followed by partial displacement or dilution of the acetic acid with the addition of the indicated liquid acetic anhydride prior to the high-temperature vapor phase acetylation. We have found that the presence of excess acid for very long periods during the vapor phase acetylation degrades the product very sharply, lowering its uniformity of acetylation, the degree of polymerization, color stability, strength, dielectric properties and other desirable characteristics. On the other hand, preswelling the fiber and preventing it from deswelling until some acetylation at least has taken place during the acetylation phase cannot successfully be eliminated. Unswollen cellulose fiber will not acetylate to any substantial degree, particularly in the absence of catalysts.

In a preferred operation of the invention concentrated acetic acid is sprayed onto a cellulose sheet and then the acetic anhydride is sprayed onto the cellulose sheet. The sheet is accordingly saturated with a mixture of acetic acid and acetic anhydride, for example in the ratio of 3:7, as it enters the reactor. In one variation of the pretreatment the sheet to which acetic acid has been applied could be passed over a suction box and under a spray of acetic anhydride to reduce the amount of acetic acid.

The process of the invention results in the production of a superior acetylated cellulose. The product may be prepared to retain its original physical form, have any desired acetyl content up to about 30 percent, a surprisingly high intrinsic viscosity (indicating minimum degradation), excellent strength and electrical resistance, and all with a minimum expenditure of chemicals and time. Furthermore, since catalysts are not used, contamination of spent chemicals is reduced and their recovery for reuse greatly expedited.

The following examples illustrate operations carried out in accordance with the invention:

Example I

The acetylations of this example were all performed on portions of a roll of Southern Pine sulfate paper grade wood pulp having an alpha cellulose content of 89 percent and an intrinsic viscosity of 7.5 according to standard Tappi tests. The equipment used consisted of an experimental pilot-type continuous reactor formed of a pretreating unit, an acetic anhydride bath and a closed, thermostatically controlled acetylator containing built-in electrical heating units. In the pretreating unit provision was made for the controlled, uniform addition of glacial acetic acid to the cellulosic sample and its retention therein for various times to effect swelling and equilibration. This was accomplished by means of a reciprocating nozzle that sprayed controlled amounts of the acid onto a distributing roll, which in turn applied said acid evenly to the pulp sheet after which the sheet continued on over a series of idler rolls to an adjustable-speed take-up roll. Leaving the pretreating unit, the swollen cellulosic sample passed through a bath containing acetic anhydride and then directly into the acetylator where it was immediately contacted with dry super-heated acetic anhydride vapor as it passed over a series of rolls. The superheated acetic anhydride vapor was prepared by passing saturated vapor from a boiler through a super-heating heat exchanger attached to the acetylator with a suitable system of pipes and could be circulated at varying rates of speed as desired. (In starting up the acetylator it was slowly purged with nitrogen as it heated up until the exit gases contained less than 9 percent of oxygen before any superheated anhydride vapors, etc. were admitted in order to avoid formation of an explosive mixture therein).

Preliminary experiments with the equipment indicated that in the absence of the acetic acid pretreatment the wood pulp used in the following experiments could be contacted with the superheated acetic anhydride vapors in the acetylator for periods up to 4 hours without it attaining an acetyl content of over about 3 percent. Correspondingly, treatment of the wood pulp in the pretreating unit with 30 percent of its weight of glacial acetic acid for 36 hours resulted in an acetyl content of only 3.4 percent. One hour contact of the pretreated pulp with the superheated anhydride vapors in the acetylator on the other hand resulted in an acetyl content of 26.2 percent. This shows the synergistic effect of the combination disclosed in the present invention.

In Table I the results obtained by contacting the foregoing wood pulp with superheated acetic anhydride vapor for various times at a temperature of 150–200° C. are shown. The wood pulp was pretreated with 30 percent of its weight of glacial acetic acid for 36 hours at ambient temperatures, passed slowly through a bath of acetic anhydride and then into the acetylator. Atmospheric pressure was maintained in the acetylator.

TABLE I

| Sample | Time in acetylator, minutes | Acetyl content of product, percent | Cuene IV of product |
|---|---|---|---|
| (A) Pulp (no pretreatment or acetylation) | | | 7.5 |
| (B) Pretreated | 0.0 | 3.4 | 7.15 |
| (C) Pretreated | 4.1 | 4.0 | 7.34 |
| (D) Pretreated | 10.0 | 5.7 | 7.31 |
| (E) Pretreated | 15.6 | 9.1 | 7.18 |
| (F) Pretreated | 21.6 | 11.3 | 7.13 |
| (G) Pretreated | 27.4 | 13.8 | 6.82 |
| (H) Pretreated | 30.0 | 17.3 | 6.79 |
| (I) Pretreated | 60.0 | 26.2 | |

Example II

As previously indicated, the pretreatment time is not particularly critical as long as the fiber is swollen before acetylation. This is rather clearly indicated in the results shown in Table II. The same wood pulp and equipment were used as in Example I. The pretreatment time at ambient temperatures was varied as indicated, after which the sample was slowly run through a bath of acetic anhydride at 30° C. and into the acetylator. The treatment of all samples in the acetylator was uniform comprising contacting each sample with dry superheated acetic anhydride vapor at a temperature of 200° C., and atmospheric pressure for 30 minutes.

TABLE II

| Pulp Sample | Time pretreated, hours-minutes | Acetyl content, percent |
|---|---|---|
| No pretreatment (only acetylator) | 0-0 | 3.0 |
| A | 0-1 | 18.7 |
| B | 0-30 | 18.1 |
| C | 1-0 | 18.0 |
| D | 2-0 | 18.4 |
| E | 4-0 | 18.2 |
| F | 22-0 | 18.7 |

Example III

The partially acetylated products of this invention are particularly useful as laminating insulating materials in the electrical field. This is illustrated in the results given in Table III. The five samples listed were taken at random during a ten-day run of a sulfate paper pulp through the reactor described in Example I. The pulp prior to acetylation had an alpha cellulose content of 89 percent, a Cuene I.V. of 7.2 and a moisture content of 10.4 percent. In the pretreator it was given sufficient glacial acetic acid to contain 30 percent of said acid based on the bone-dry weight of the pulp and equilibrated for 25 minutes at ambient temperatures. It was then passed through a bath of acetic anhydride and into the acetylator where it was contacted for 25 minutes at atmospheric pressure with dry superheated acetic anhydride vapors at a temperature of from 185–196° C. The products had an average Cuene I.V. of 6.7 and an acetyl content of 16.2±0.4 percent. The tests given in Table III were made by standard Tappi methods on portions of the products beaten to freeness of 340–375 CSF in tap water. Aging of the indicated samples was at 180° C. for 24 hours.

TABLE III

| Sample aged | I | | II | | III | | IV | | V | |
|---|---|---|---|---|---|---|---|---|---|---|
| | Yes | No | Yes | No | Yes | No | Yes | No | Yes | No |
| Mullen | 62 | 58 | 60 | 57 | 61 | 58 | 61 | 60 | 51 | 36 |
| Tear | 1.00 | 1.77 | 0.98 | 1.77 | 1.02 | 1.71 | 1.03 | 1.74 | 0.94 | 1.56 |
| Fold | 0.6 | 1.1 | 0.5 | 1.0 | 0.5 | 0.9 | 0.6 | 0.9 | 0.3 | 0.3 |
| Density | 4,370 | 4,200 | 4,470 | 3,780 | 4,440 | 4,170 | 4,460 | 4,070 | 3,510 | 2,770 |
| Klemm, mm | 10 | 7 | 8 | 8 | 9 | 8 | 9 | 7 | 16 | 19 |
| Electrical Resist.: | | | | | | | | | | |
| 50 v | 19,400 | 1,250 | 19,600 | 1,260 | 19,700 | 1,240 | 18,800 | 1,220 | 19,800 | 1,600 |
| 500 v | 9,240 | 320 | 7,460 | 340 | 7,960 | 390 | 7,600 | 375 | 8,400 | 385 |

What is claimed is:

1. The process for the acetylation of an air-dried sheet of fibrous cellulose in the form of a matte or web which comprises swelling the cellulosic fiber in said sheet by wetting it with concentrated acetic acid, removing any acetic acid in excess of 60% by weight based on the weight of the cellulose, impregnating the sheet of swollen cellulosic fiber with acetic anhydride at a temperature varying from ambient to about 140° C., and then subjecting the swollen sheet of impregnated fiber to non-catalytic acetylation with an atmosphere of dry superheated vapors of acetic anhydride at substantially atmospheric pressure and at temperatures not in excess of 220° C. to result in an acetyl content of from about 3.4 to 26.2% by weight therein.

2. In the process of claim 1, swelling the cellulose fiber with from 25 to 30% by weight of glacial acetic acid for from 10 to 20 minutes.

3. In the process of claim 1, applying the acetic anhydride to the swollen fiber so as to replace at least some of the acetic acid and effecting at least some acetylation of the fiber with the acetic anhydride before the treatment with acetic anhydride vapor, and acetylating the fiber with acetic anhydride vapor at a temperature of 180° to 200° C.

4. The process of acetylating a sheet of dry cellulose fiber which comprises spraying onto a continuously moving sheet of cellulose concentrated acetic acid so as to leave on the cellulose from 10% to 60% by weight of acetic acid based on the weight of the cellulose to swell the fiber, spraying onto the swollen sheet acetic anhydride while passing the sheet over a suction box to displace some acetic acid and to effect some acetylation of the fiber, and then subjecting the sheet to non-catalytic acetylation with superheated vapors of acetic anhydride at a temperature of from 150° C. to 220° C. to produce a dry cellulose sheet in its original physical form and containing a substantial acetyl content of from 3.4 to 26.2% by weight.

References Cited

UNITED STATES PATENTS

| | | | |
|---|---|---|---|
| 1,030,311 | 6/1912 | Koetschet et al. | 260—227 |
| 2,028,761 | 1/1936 | Dreyfus et al. | 260—229 |
| 1,880,466 | 10/1932 | Noller | 260—227 |
| 1,898,687 | 2/1933 | Rice | 260—227 |
| 1,995,732 | 3/1935 | Barthelemy | 260—229 |
| 2,772,944 | 12/1956 | Allewelt | 260—229 |
| 2,780,511 | 2/1957 | Takagi | 260—227 |
| 3,051,543 | 8/1962 | Skogseid | 260—227 |
| 3,037,902 | 6/1962 | Fahey et al. | 162—157 |

DONALD E. CZAJA, *Primary Examiner.*

R. W. MULCAHY, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,145                          September 24, 1968

Dexter Edge, Jr., et al.

It is certified that error appears in the above identified patent and that said Letters Patent are hereby corrected as shown below:

Column 1, line 32, "actylation" should read -- acetylation --. Column 2, line 45, "perferabl " should read -- preferably --. Columns 3 and 4, TABLE III, second column, line 7 thereof, "9,240" should read -- 7,240 --. Column 4, line 44, after "laminating" insert -- and --.

Signed and sealed this 17th day of February 1970.

(SEAL)
Attest:

Edward M. Fletcher, Jr.                      WILLIAM E. SCHUYLER, JR.
Attesting Officer                              Commissioner of Patents